United States Patent
Gold et al.

(10) Patent No.: US 10,703,086 B2
(45) Date of Patent: Jul. 7, 2020

(54) SYSTEM AND METHOD FOR AUTHENTICATING AN ADDITIVELY MANUFACTURED COMPONENT

(71) Applicant: General Electric Company, Schenectady, NY (US)

(72) Inventors: Scott Alan Gold, Waynesville, OH (US); Thomas Graham Spears, Springdale, OH (US); David Henry Abbott, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 437 days.

(21) Appl. No.: 15/479,454

(22) Filed: Apr. 5, 2017

(65) Prior Publication Data

US 2018/0292331 A1    Oct. 11, 2018

(51) Int. Cl.
| | | |
|---|---|---|
| *B33Y 80/00* | (2015.01) | |
| *B33Y 50/02* | (2015.01) | |
| *G07D 7/06* | (2006.01) | |
| *B29C 64/153* | (2017.01) | |
| *B29C 64/20* | (2017.01) | |
| *G07D 7/2033* | (2016.01) | |

(52) U.S. Cl.
CPC ............ *B33Y 80/00* (2014.12); *B29C 64/153* (2017.08); *B29C 64/20* (2017.08); *B33Y 50/02* (2014.12); *G07D 7/06* (2013.01); *G07D 7/2033* (2013.01)

(58) Field of Classification Search
CPC ..... B33Y 10/00; B29C 64/386; B29C 64/393; G01N 23/046; G01N 29/04; G01N 29/2418; G01N 29/26; G01N 29/4427; G05B 19/4099; G05B 2219/49023; G06K 9/00577; G06Q 30/0185
See application file for complete search history.

(56) References Cited

U.S. PATENT DOCUMENTS

| | | |
|---|---|---|
| 4,350,883 A | 9/1982 | Lagarde |
| 4,806,740 A | 2/1989 | Gold et al. |
| 5,313,193 A | 5/1994 | Dubois et al. |
| 5,516,591 A * | 5/1996 | Feldstein ................. C23C 2/04 427/367 |
| 5,546,462 A | 8/1996 | Indeck et al. |
| 6,337,122 B1 | 1/2002 | Grigg et al. |
| 6,640,632 B1 | 11/2003 | Hatanaka et al. |
| 6,850,592 B2 | 2/2005 | Schramm et al. |
| 6,976,627 B1 | 12/2005 | Culp et al. |

(Continued)

FOREIGN PATENT DOCUMENTS

WO    WO2016/109111 A1    7/2016

*Primary Examiner* — Elias Desta
(74) *Attorney, Agent, or Firm* — Dinsmore & Shohl LLP

(57) ABSTRACT

A system and method for authenticating an additively manufactured component is provided. The method includes locating an identifying region of the component that includes localized density variations that define a component identifier. The method further includes interrogating the identifying region of the component using a scanning device such as an x-ray computed tomography device to obtain the component identifier. The method further includes obtaining a reference identifier from a database, comparing the component identifier to the reference identifier, and determining that the component is authentic if the component identifier matches the reference identifier.

18 Claims, 5 Drawing Sheets

(56) References Cited

U.S. PATENT DOCUMENTS

| | | |
|---|---|---|
| 7,148,448 B2 | 12/2006 | Warren, Jr. et al. |
| 7,199,367 B2 | 4/2007 | Favro et al. |
| 7,217,102 B2 | 5/2007 | Rockstroh et al. |
| 7,250,864 B2 | 7/2007 | Murofushi et al. |
| 7,584,833 B2 | 9/2009 | Howells |
| 7,602,963 B2 | 10/2009 | Nightingale et al. |
| 8,003,040 B2 * | 8/2011 | El-Siblani .......... A61C 13/0013 264/401 |
| 8,222,567 B2 | 7/2012 | Mathai et al. |
| 8,524,633 B2 * | 9/2013 | Masuda ................ B41M 3/144 283/92 |
| 8,536,860 B2 | 9/2013 | Boenisch |
| 8,837,672 B2 | 9/2014 | Nance et al. |
| 8,935,286 B1 | 1/2015 | Westerman, Jr. et al. |
| 8,973,829 B2 | 3/2015 | Atkinson et al. |
| 8,985,471 B2 | 3/2015 | Freeman |
| 9,036,916 B2 | 5/2015 | Le |
| 9,074,927 B2 | 7/2015 | Singh et al. |
| 9,250,183 B2 | 2/2016 | Smith et al. |
| 9,311,652 B2 | 4/2016 | Farn et al. |
| 9,360,589 B1 | 7/2016 | Meinhold et al. |
| 9,400,910 B2 | 7/2016 | Kumar et al. |
| 9,414,891 B2 | 8/2016 | Kieser |
| 9,424,503 B2 | 8/2016 | Kieser |
| 2002/0126889 A1 | 9/2002 | Pikler et al. |
| 2008/0159529 A1 | 7/2008 | Aarts et al. |
| 2009/0286007 A1 | 11/2009 | Brancher |
| 2013/0193214 A1 | 8/2013 | Margulis et al. |
| 2014/0205083 A1 | 7/2014 | Pryakhin et al. |
| 2014/0263674 A1 | 9/2014 | Cerveny |
| 2015/0147585 A1 | 5/2015 | Schwarze et al. |
| 2015/0308337 A1 | 10/2015 | Marasco et al. |
| 2015/0324677 A1 | 11/2015 | Talyansky et al. |
| 2016/0107764 A1 | 4/2016 | O'Kell et al. |
| 2016/0207345 A1 | 7/2016 | Farmer et al. |
| 2016/0253586 A1 | 9/2016 | Cook et al. |
| 2016/0260001 A1 | 9/2016 | Flores et al. |
| 2016/0283834 A1 | 9/2016 | Bobbitt, III |
| 2016/0298268 A1 | 10/2016 | Gallucci et al. |
| 2016/0306088 A1 | 10/2016 | Ouderkirk et al. |
| 2016/0307083 A1 | 10/2016 | Kumar et al. |
| 2016/0311164 A1 | 10/2016 | Miyano |
| 2017/0120338 A1 | 5/2017 | Goeing et al. |
| 2017/0232779 A1 * | 8/2017 | Viens .................. B42D 25/324 359/558 |

* cited by examiner

SYSTEM AND METHOD FOR AUTHENTICATING AN ADDITIVELY MANUFACTURED COMPONENT

FIELD

The present subject matter relates generally to additively manufactured components, and more particularly, to systems and methods for authenticating additively manufactured components including features for improved part identification or counterfeit prevention.

BACKGROUND

Original equipment manufacturers (OEMs) in a variety of industries have an interest in ensuring that replacement components used with their products or equipment are manufactured according to standards set and controlled by the OEM. Using the aviation industry as an example, the manufacturer of a gas turbine engine, as well as the airlines and the passengers that rely on them, can be exposed to serious risks if counterfeit or replica replacement parts are readily available for and installed on these engines.

For example, such counterfeit components can pose a severe risk to the integrity of the gas turbine engines or may otherwise result in a variety of problems for the OEM and the end user. More specifically, OEM components may require rigorous attention to detail to ensure sound material properties and capabilities for the specific application as well as sophisticated inspections to verify the component performance. OEMs cannot ensure the integrity or compatibility of counterfeit parts, which may result in dangerous engine operation and increase the risk of potential failure.

In addition, counterfeit parts compromise the OEMs ability to control the quality associated with their products. For example, inexpensive replicas and inferior components on the market are a real threat, both to the engines on which they are installed and to the reputation of the OEM. Moreover, failure of a gas turbine engine due to a counterfeit replacement component might subject the OEM to misdirected legal liability and OEMs may lose a significant revenue stream by not being able to control the sale of OEM replacement components.

Additive manufacturing technologies are maturing at a fast pace. For example, very accurate additive manufacturing printers using a variety of materials, such as metals and polymers, are becoming available at decreasing costs. In addition, improved scanning technologies and modeling tools are now available. As a result, certain OEMs are beginning to use such technologies to produce original and replacement parts. However, the advance of additive manufacturing technologies also results in a lower barrier to entry into the additive manufacturing space. Therefore, replacement components may be more easily reverse engineered and copied, and there is an increased risk of third parties manufacturing and installing counterfeit components on OEM equipment, such as a gas turbine engine, resulting in the dangers described briefly above.

There is thus a need for a technology that allows genuine parts to be distinguished from counterfeits to ensure that parts created through additive manufacturing cannot be duplicated by an unauthorized third party and passed off as genuine OEM parts. Accordingly, additively manufactured components including features that may be used to identify, authenticate, and distinguish genuine parts from counterfeit parts would be useful.

BRIEF DESCRIPTION

Aspects and advantages of the invention will be set forth in part in the following description, or may be obvious from the description, or may be learned through practice of the invention.

In one exemplary embodiment of the present disclosure, a method of authenticating an additively manufactured component is provided. The method includes locating an identifying region of the component, the identifying region including localized density variations that define a component identifier of the component. The method further includes obtaining data indicative of the component identifier of the component by interrogating the identifying region of the component using a scanning device and determining that the component is authentic based on the data acquired by the scanning device.

In another exemplary aspect of the present disclosure, a system for authenticating an additively manufactured component is provided. The system includes one or more processors and one or more memory devices, the one or more memory devices storing computer-readable instructions that when executed by the one or more processors cause the one or more processors to perform operations. The operations include obtaining data indicative of an identifying region of the component, the identifying region containing one or more localized density variations that define a component identifier. The operations include determining the component identifier by interrogating the identifying region of the component using a scanning device. The operations further include obtaining a reference identifier from a database determining that the component is authentic if the component identifier matches the reference identifier.

In still another exemplary aspect of the present disclosure, a method of authenticating a component is provided. The method includes interrogating an identifying region of the component using x-ray computed tomography to generate a map of localized density variations within the identifying region, the map of localized density variations defining a component identifier. The method further includes obtaining a reference identifier from a database and determining that the component is authentic if the component identifier matches the reference identifier These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
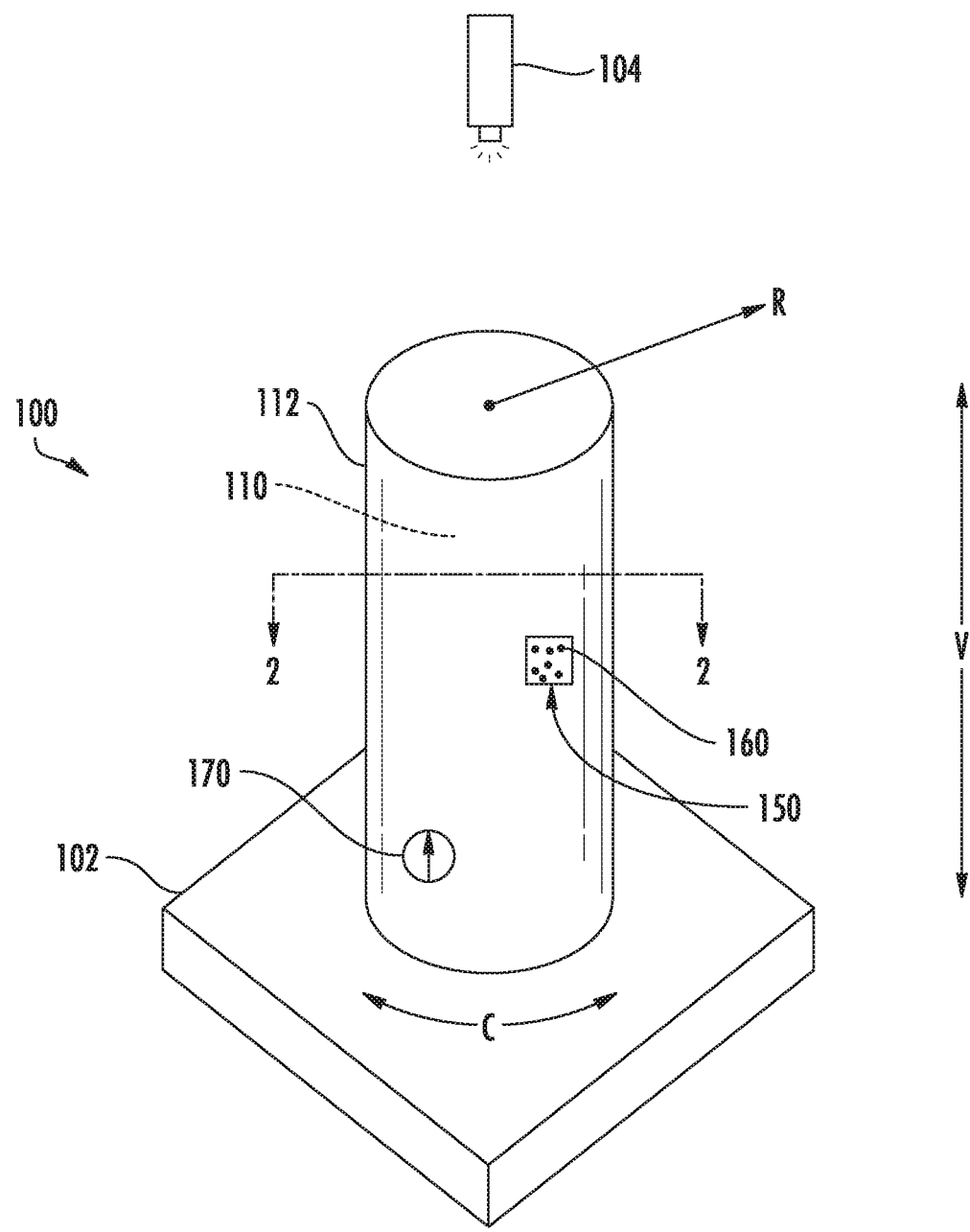
FIG. 1 provides a perspective view of an additively manufactured component according to an exemplary embodiment of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The present disclosure is generally directed to a system and method for authenticating an additively manufactured component. The method includes locating an identifying region of the component that includes localized density variations that define a component identifier. The method further includes interrogating the identifying region of the component using a scanning device such as an x-ray computed tomography device to obtain the component identifier. The method further includes obtaining a reference identifier from a database, comparing the component identifier to the reference identifier, and determining that the component is authentic if the component identifier matches the reference identifier.

In general, the components described herein may be manufactured or formed using any suitable process. However, in accordance with several aspects of the present subject matter, these components may be formed using an additive-manufacturing process, such as a 3-D printing process. The use of such a process may allow the components to be formed integrally, as a single monolithic component, or as any suitable number of sub-components. In particular, the manufacturing process may allow these components to be integrally formed and include a variety of features not possible when using prior manufacturing methods. For example, the additive manufacturing methods described herein enable the manufacture of components having various features, configurations, thicknesses, materials, densities, surface variations, and identifying features not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or any surface features such as irregularities, component identifiers, localized material variations, or datum features, as well as internal passageways, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, overlap between passes, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and novel surface features. All of these features may be relatively complex and intricate for avoiding detection and/or impeding counterfeiting by a third party. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and may be easily distinguished from replicas or counterfeit components.

Figure 2:
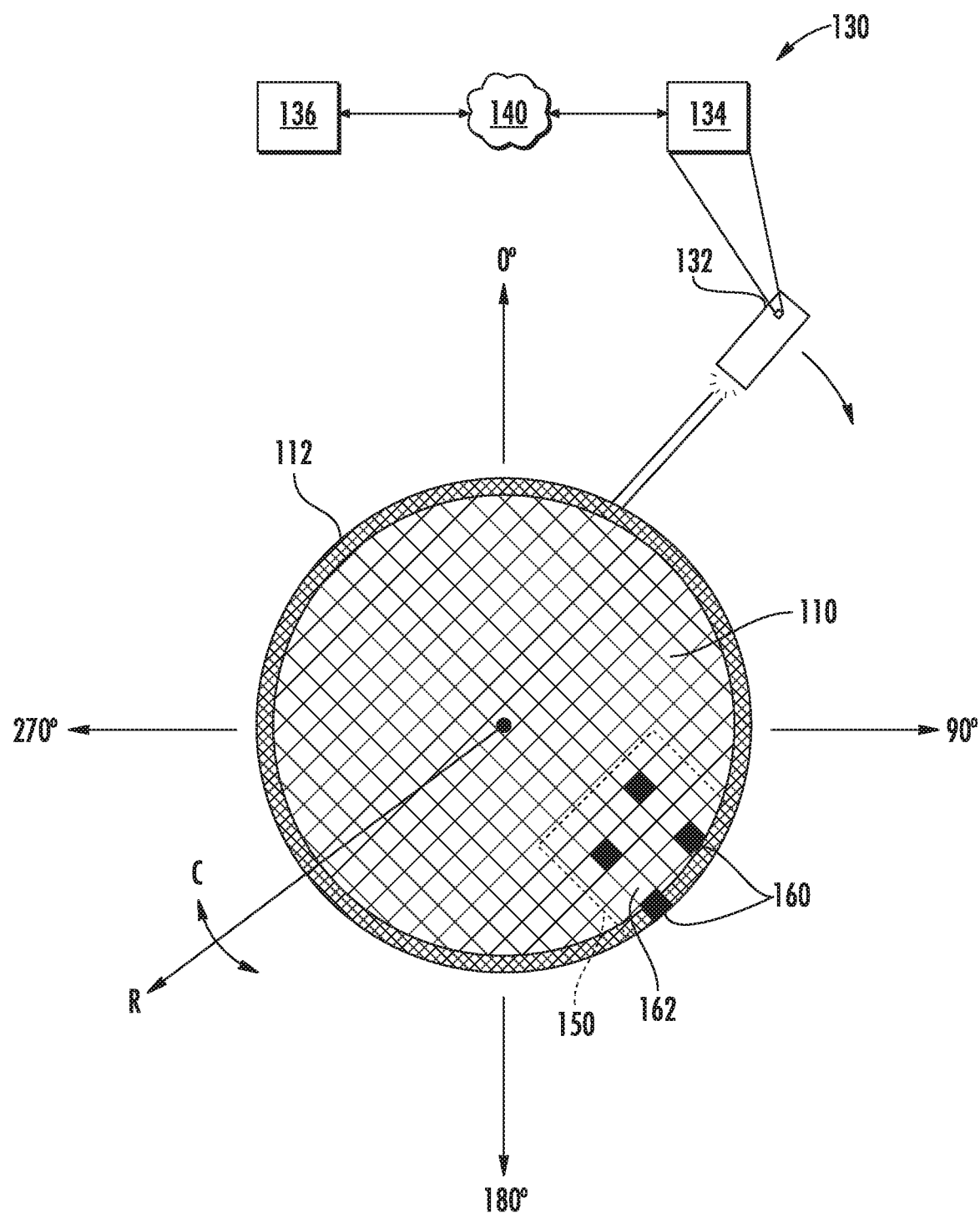
FIG. 2 provides a cross sectional view of the exemplary component of FIG. 1, taken along Line 2-2 of FIG. 1.
Figure 3:
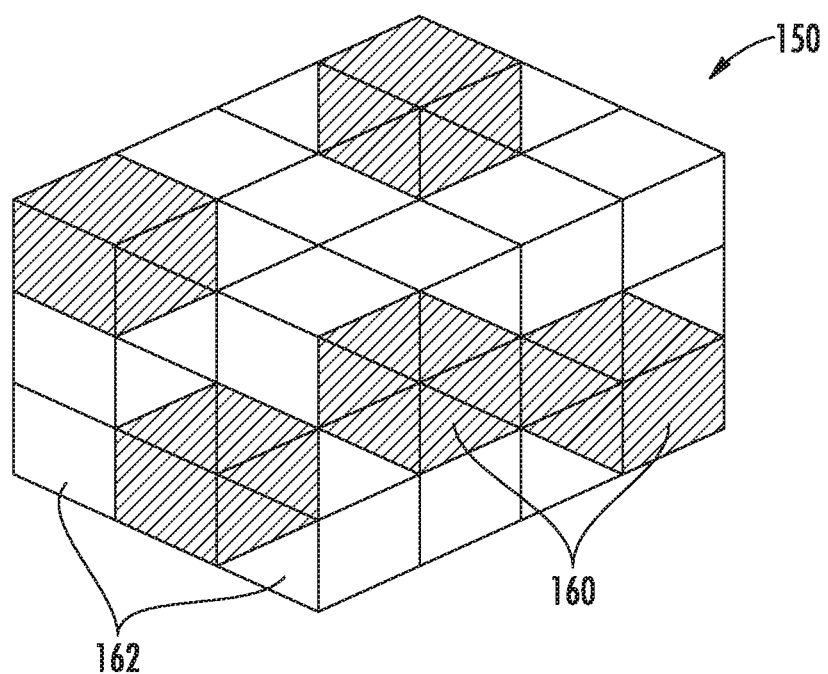
FIG. 3 is a schematic representation of the density variation within a three dimensional identifying region of the exemplary component of FIG. 1 according to an exemplary embodiment of the present subject matter.

Referring now to FIGS. 1 through 3 an additively manufactured component 100 according to an exemplary embodiment of the present subject matter is provided. More specifically, FIG. 1 provides a perspective view of component 100 and FIG. 2 provides a cross sectional view of component 100, taken along Line 2-2 of FIG. 1. FIG. 3 provides a schematic representation of the density variation within a three dimensional identifying region of component 100, as measured and described below.

Referring now specifically to FIG. 1, for the purpose of explaining aspects of the present subject matter, component 100 is a simple, solid cylinder. However, it should be appreciated that the additive manufacturing methods described herein may be used to form any suitable component for any suitable device, regardless of its material or complexity. As illustrated, component 100 generally defines a radial direction R, a circumferential direction C, and a vertical direction V.

Also illustrated in FIG. 1 is an additive manufacturing platform 102 and an energy source 104, as may be used according to any of the additive manufacturing methods described above. For example, component 100 may be constructed by laying a powder bed onto platform 102 and selectively fusing the powder bed at desired locations using energy source 104 to form a layer of component 100. Platform 102 may be lowered along the vertical direction V after each layer is formed and the process may be repeated until component 100 is complete.

Referring to FIG. 2, a cross sectional view of component 100 taken along Line 2-2 (or more specifically, a plane corresponding to this line) will be described. It should be appreciated that FIG. 2 illustrates a top view of a single additively manufactured layer of component 100 having a finite thickness. As illustrated, component 100 includes a cross sectional layer 110. Cross sectional layer 110 may generally define an interior body layer and a surface 112. As used herein, "interior body layer" may refer to any structure, body, surface, base layer, or other portion of component 100 on which a surface may be formed. In this regard, for example, component 100 includes surface 112 that is formed around cross sectional layer 110, i.e., along a perimeter or periphery of cross sectional layer 110 along the circumferential direction C. As used herein, "surface" may refer to the periphery of one or more cross sectional layer 110 of component 100, e.g., formed on an otherwise exposed interior body layer.

According to the illustrated embodiment, cross sectional layer 110 and surface 112 may be formed at different energy levels and may have different structural characteristics. As used herein, an "energy level" of an energy source is used generally to refer to the magnitude of energy the energy source delivers to a particular point or region of component 100. For example, if the energy source is a laser or an electron beam, the energy level is generally a function of the power level and the scan speed of the laser or electron beam. As used herein, "scan speed" is used generally to refer to the linear velocity of the energy source along a surface of the additively manufactured component. Notably, the energy level of an energy source directed toward a powder bed may also be manipulated by adjusting the scanning strategy, e.g., by increasing the overlap between adjacent passes of the energy source over the powder bed.

Adjusting the energy level of energy source 104 can enable the formation of component 100 with different regions having different densities and structural properties. For example, a higher energy level may be achieved by increasing the power level of energy source 104 (e.g., in Watts), decreasing its scan speed, or increasing the overlap between adjacent passes of energy source 104 to direct more energy onto a single area of the powder bed. By contrast, a lower energy level may be achieved by decreasing the power level of energy source 104, increasing its scan speed, or decreasing the overlap between adjacent passes of energy source 104 to direct less energy onto a single area of the powder bed.

According to the exemplary embodiment, component 100 is formed by moving energy source 104 (or more specifically, a focal point of the energy source 104, as shown in FIG. 1) along a powder bed placed on platform 102 to fuse together material to form component 100. According to the exemplary embodiment, a first energy level (e.g., a higher energy level) is used to form cross sectional layer 110 and a second energy level (e.g., a lower energy level) is used to form surface 112. It should be appreciated that this is only one exemplary construction of component 100. According to alternative embodiments, components formed using the methods described herein may have any suitable size and number of sections formed using any suitable energy source, at any suitable energy level, and having any suitable scanning strategy.

According to exemplary embodiments of the present subject matter, component 100 may include a component identifier that may be used by the component manufacturer, an end user, or another third party to authenticate or positively identify component 100. For example, the component identifier may be integrated with component 100 such that the component identifier remains associated with component 100 throughout the lifetime of component 100. The component identifier may be unique to a specific component, may be associated with a group of components manufactured at the same time, or may refer to a type of component in general.

Exemplary component identifiers may be any sequence of features such as bumps, divots, or other surface aberrations that contain or define encoded information in a manner analogous to a printed serial number, a bar code, or a QR code, e.g., for uniquely identifying component 100. In addition, such component identifiers may be localized component materials, configurations, densities, surface variations, or other features suitable for generating the component identifier when interrogated with some type of scanner, such as described below. The component identifiers may be inherent in the manufactured component (e.g., natural density variations) or may be intentionally designed and manufactured into the component. The exemplary component identifiers described herein are used only to illustrate aspects of the present subject matter and are not intended to limit its scope.

In order to read the component identifiers to identify, distinguish, or authenticate component 100, the manufacturer or an authorized end user may use some suitable scanning device, probe, or detector for reading the component identifier. For example, referring to FIG. 2 an authentication system 130 for authenticating components will be described according to exemplary embodiments of the present subject matter. As will be described in more detail below, according to exemplary embodiments of the present subject matter, localized variations in the density of component 100 may define the component identifier. In this regard, for example, authentication system 130 may generally include an x-ray computed tomography (x-ray CT) device 132 for measuring localized density variations within component 100 to determine the component identifier.

According to the illustrated embodiment, x-ray CT device 132 is generally configured for using principles of x-ray computed tomography for measuring and mapping the density of component 100. This process of scanning, reading, mapping, or otherwise obtaining useful data regarding the localized density variations within component 100 is referred to herein as "interrogation" of component 100. X-ray CT device 132 may pass over surface 112 of component 100 in any suitable manner for interrogating component 100, thereby rendering some useful data regarding component 100, e.g., the component identifier.

In general, x-ray CT is a nondestructive inspection method that enables the visualization of interior features, geometries, and properties within solid objects. In this regard, x-ray CT generally takes multiple cross sectional images (or "slices") of an object by measuring the attenuation and absorption of x-rays. A computer is used to combine those virtual "slices" into a single three dimensional model of the object. Therefore, for example, x-ray CT may be used to determine density variations with a specific region of a component. Although x-ray CT device 132 is used herein to explain aspects of the present subject matter, it should be appreciated that other suitable scanning devices and interrogation methods may be used to measure density variations while remaining within the scope of the present subject matter. For example, alternative interrogation methods may use non-destructive confocal optical microscopy or a destructive test such as where a surface is successively scanned and etched or abraded away to obtain a depth profile.

According to the illustrated embodiment, x-ray CT device 132 includes a controller 134 which is generally configured for receiving, analyzing, transmitting, or otherwise utilizing data acquired by x-ray CT device 132. Controller 134 can include various computing device(s) (e.g., including processors, memory devices, etc.) for performing operations and functions, as described herein. For reasons described in more detail below, x-ray CT device 132, or more specifically, controller 134, may further be in communication with a database or remote computing system 136, e.g., via a network 140, and may be configured for transmitting or receiving information related to component 100, e.g., such as its component identifier.

As explained above, exemplary embodiments of the present subject matter contemplate the use of localized density variations as a unique component identifier. In this regard, for example, component 100 may have an identifying region 150 that contains one or more localized density variations 160 that define the component identifier. As used herein, "localized density variation" is used to refer to any portion or region of component 100 that has an average density that is measurably different than the surrounding primary material density. In this manner, by detecting the location and relative positioning of these localized density variations 160, a unique component identifier may be defined and measured, e.g., by interrogating identifying region 150 with x-ray CT device 132.

Localized density variations 160 may be inherent in the additively manufactured component or may be intentionally designed and introduced into the component by the manufacturer. In this regard, for example, inherent density variations may form naturally during the additive manufacturing process for various reasons, i.e., they might not be purposefully introduced. For example, even if identifying region 150 of component 100 is formed entirely out of a single material, it will have natural density variations due to, e.g., small irregularities introduced during the additive manufacturing process or small variations in material density. Therefore, different components or even different regions of the same component can include natural localized density variations that may correspond to a unique component identifier. By locating and interrogating an identifying region of a component, a map of these inherent density variations may be obtained which may be used for future component authentication.

According to another exemplary embodiment, a manufacturer of a component may intentionally introduce designed localized density variations 160. It may be desirable to differentiate between inherent density variations and intentionally introduced density variations. Therefore, according to exemplary embodiments, localized density variations 160 may be formed such that they may be distinguished from "noise" generated by the natural density variations. In this regard, for example, localized density variations 160 may have densities measurably different than the density of the surrounding primary material. In determining the component identifier, controller 134 may be configured for filtering out the natural density variations to isolate localized density variations 160. According to still another embodiment, localized density variations 160 may be used collectively with these inherent density variations to define the component identifier.

According to exemplary embodiments, localized density variations 160 may be formed by manipulating an energy level of energy source 104 by adjusting at least one of a power of the energy source, a scan speed of the energy source, and a scan strategy of energy source 104. More specifically, for example, the energy level of energy source 104 may be decreased to selectively underexpose a layer of powder to generate voids within identifying region 150. In this manner, by not fusing all of the powder within a region of the powder bed, that particular region will be relatively less dense than the surrounding completely fused portion of the powder bed. Similarly, the energy level of energy source 104 may be increased to selectively overexpose the powder material to generate boiling porosity within the identifying region 150. In this manner, the melt pool generated by energy source 104 boils and forms air bubbles that solidify and result in a region that is relatively less dense than the surrounding completely fused portion of the powder bed.

According to another exemplary embodiment of the present subject matter, localized density variations 160 may be formed by introducing multiple materials having different densities during the additive manufacturing process. More particularly, for example, a layer of powder may be deposited within identifying region 150 that includes a first material having a first density and a second material having a second density. The layer of powder is fused and the second material remains selectively positioned within the first material to define localized density variations 160 and the component identifier of component 100. In this manner, by depositing and fusing a pattern of material having a recognizably different density into the primary material, a unique component identifier may be defined.

It should further be appreciated that any suitable number and type of localized density variations 160 may be used to generate the desired component identifier. For example, according to alternative exemplary embodiments, identifying region 150 may include primary material 160, a second material forming localized density variations 160, and a third material region having a third density. In such an embodiment, the component identifier may be defined by the selective positioning of both the second material and the third material within identifying region 150.

According to other exemplary embodiments, localized density variations 160 may be introduced to identifying region 150 of component 100 by laser shock peening. In this regard, localized shock waves may be imparted by laser pulses on component 100 to compress, deform, or otherwise compact material on component 100, thus changing its localized density. For example, using a laser to shock peen select locations within identifying region 150 could generate localized density variations 160 defining a unique component identifier. This process of laser shock peening localized density variations 160 into identifying region 150 may include alternating between additively manufacturing one or more layers of identifying region 150 and laser shock peening that layer. For example, a first layer of powder material may be deposited and fused, the solidified layer may be selectively laser shock peened to create localized density variations 160, another layer of powder may be deposited and fused, and the process may be repeated.

Referring now to FIG. 3, a schematic representation of the density variation within a region of component 100 is provided. More specifically, FIG. 3 illustrates an exemplary representation of identifying region 150 as scanned using x-ray CT device 132 to determine the component identifier of component 100. As illustrated, identifying region 150 is a three-dimensional block or cube of component 100 that is discretized into a plurality of sub-regions or smaller cubes. X-ray CT device 132 scans identifying region 150, e.g., by passing repeatedly over a substantially rectangular region of surface 112 to interrogate multiple slices or layers of component 100. These repeated scans generate density information for each discretized portion of identifying region 150, and these scans are combined as described above to generate a three-dimensional representation of identifying region 150.

As illustrated, identifying region 150 contains localized density variations 160 (as indicated by shaded blocks) selectively positioned within a primary material region 162 (as indicated by transparent blocks). In general, localized density variations 160 identify regions having a measurably different density than the primary material regions 162. According to one exemplary embodiment, localized density variations 160 are defined as regions having an average density that is different from the average primary material density by a predetermined amount. For example, the density within localized density variations 160 may be greater than five percent different than primary material region 162, or greater than fifteen percent different, etc.

Although FIG. 3 illustrates the discrete regions of identifying region 150 as being either a primary material region 162 having a first density or a localized density variations 160 have a second density, it should be appreciated that the transparent and shaded blocks are only used for the purpose of explaining aspects of the present subject matter. In reality, localized densities are not discrete "high" or "low" densities, but instead vary continuously along a density spectrum. Similarly, discrete three-dimensional blocks or cubes are used to discretize the interrogated region of component, but such discretization is not intended to limit the scope of the present subject matter. Indeed, according to alternative embodiments, the component identifier may be defined by precise density values associated with precise locations of component 100, e.g., using a lookup table or algorithm that associates a density magnitude with a given coordinate location using an X-Y-Z coordinate system.

To further reduce the likelihood of counterfeiting, it may be desirable to make locating identifying region 150 and localized density variations 160 more difficult, e.g., to avoid detection using conventional low-tech scanning means. Therefore, according to an exemplary embodiment, localized density variations 160 may be formed such that they are undetectable to the human eye or may be located and interrogated only using a specialized scanning device. For example, according to an exemplary embodiment, surface 112 may be formed over identifying region 150 to obscure its view. More specifically, a layer of surface powder may be deposited over identifying region 150 and may be fused to form surface 112. In this manner, localized density variations may not be visible to the human eye and may only be interrogated using x-ray CT device 132.

According to an exemplary embodiment of the present subject matter, it may also be desirable to include one or more additional features on component 100 which assist the manufacturer or an end user in locating identifying region 150 which may contain localized density variations 160. For example, as explained above, localized density variations 160 may not be visible to the human eye. Thus, to avoid the need to scan the entire component 100 to locate and interrogate localized density variations 160, one or more datum features may be used as a reference from which an authorized end user may find identifying region 150.

More specifically, referring again to FIG. 1, component 100 further includes a datum feature 170 that is visible to the human eye or otherwise easily detectable. For example, according to the exemplary embodiment, datum feature 170 has a size that is greater than about one millimeter. According to another embodiment, datum feature 170 is a localized density variation located outside identifying region 150. Moreover, datum feature 170 may indicate both a position and an orientation of component 100. According to the illustrated embodiment, datum feature 170 is formed within surface 112 of component 100. However, it should be appreciated that according to alternative embodiments, datum feature 170 may be formed within the interior of component 100 or cross sectional layer 110 and/or within both the interior of cross sectional layer 110 and surface 112 of component.

Datum feature 170 is located at a predetermined location relative to identifying region 150—and thus localized density variations 160. In this manner, an authorized third party who knows the relative positioning of datum feature 170 and identifying region 150 may easily locate datum feature 170 and use it as a reference for locating and interrogating identifying region 150 to read the localized density variations 160. More specifically, an authenticating party may know where to position and how to orient x-ray CT device 132 to read the component identifier.

It should be appreciated that component 100 is described herein only for the purpose of explaining aspects of the present subject matter. For example, component 100 will be used herein to describe exemplary methods of manufacturing and authenticating additively manufactured components. It should be appreciated that the additive manufacturing techniques discussed herein may be used to manufacture other components for use in any suitable device, for any suitable purpose, and in any suitable industry. Furthermore, the authentication methods described herein may be used to identify, authenticate, or otherwise distinguish such components. Thus, the exemplary components and methods described herein are used only to illustrate exemplary aspects of the present subject matter and are not intended to limit the scope of the present disclosure in any manner.

Now that the construction and configuration of component 100 according to an exemplary embodiment of the present subject matter has been presented, an exemplary method 200 for authenticating a component according to an exemplary embodiment of the present subject matter is provided. Method 200 can be used by a customer or end user of a component, e.g., such as the end user of component 100, for validating that the component is authentic and is not a counterfeit component. It should be appreciated that the exemplary method 200 is discussed herein only to describe exemplary aspects of the present subject matter, and is not intended to be limiting.

Figure 4:
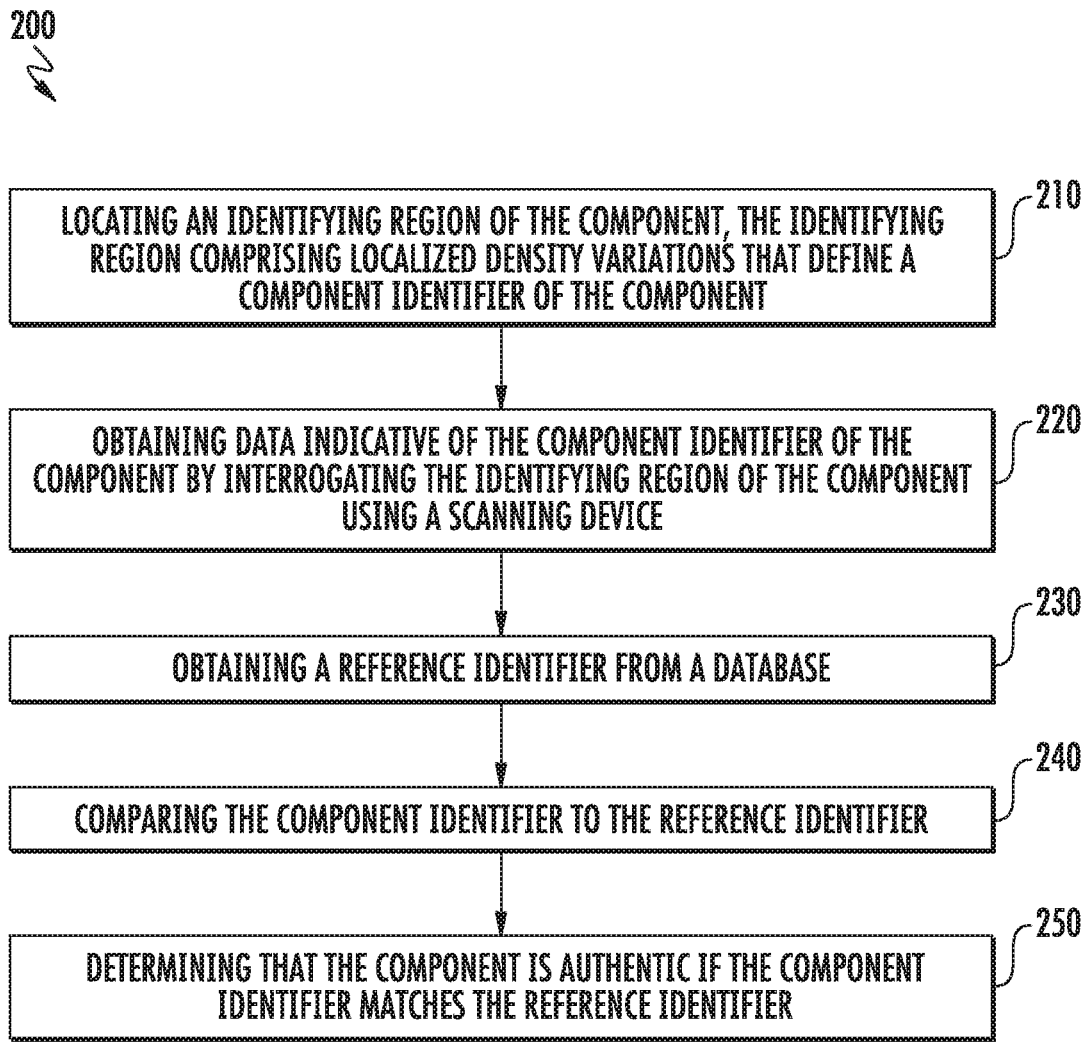
FIG. 4 is a method for authenticating an additively manufactured component according to an exemplary embodiment of the present subject matter.

Referring now to FIG. 4, method 200 includes, at step 210, locating an identifying region of the component, the identifying region comprising localized density variations that define a component identifier of the component. The identifying region may be formed using any of the methods described above, including selectively depositing materials having different densities during the additive manufacturing process, manipulating the energy level of the energy source to selectively underexpose or overexpose the layer of powder, or laser shock peening the identifying region during the additive manufacturing process. The resulting localized density variations may define the component identifier of the component.

According to exemplary embodiments of the present subject matter, the identifying region may be located by visual inspection, by inspection with a scanning device, or based on knowledge of the location of identifying region relative to other component features. For example, according to exemplary embodiments, the component to be authenticated includes a datum feature that is located at a predetermined location relative to the identifying region. Thus, method 200 may further include locating the datum feature on the component and determining the location of the identifying region based on the location of the datum feature. In this manner, the datum feature may be useful in locating the identifying region and positioning and orienting a scanning device, such as an x-ray CT device, for interrogating the component. This is particularly true when the localized density variations within the identifying region are not readily detectable.

Method 200 further includes, at step 220, obtaining data indicative of the component identifier by interrogating the identifying region of the component with a scanning device, such as an x-ray CT device. For example, step 220 may include interrogating identifying region 150 of component 100 using x-ray CT device 132 to generate a map of the component identifier similar to that illustrated in FIG. 3. The component identifier may be used for component authentication, as described further below.

Step 230 includes obtaining a reference identifier from a database. In general, the reference identifier may be the component identifier as measured and catalogued in a database by the manufacturer of the component for purposes of future component authentication. For example, after additively manufacturing a component, the manufacturer may define an identifying region of the component and scan that region to determine a reference identifier associated with that particular component. The manufacturer of the component enters the reference identifier into the database and controls the database of authentic components. According to an exemplary embodiment, the reference identifier may be obtained from a database stored locally, e.g., on controller 134. Alternatively, the database may be remotely stored and may be accessed, for example, through remote computing system 136 via network 140.

Step 240 includes comparing the component identifier to the reference identifier and step 250 includes determining that the component is authentic if the component identifier matches the reference identifier. In this regard, for example, controller 134 may receive the reference identifier from a database and may be programmed to compare the reference identifier and the component identifier to positively determine whether the component is authentic. Alternatively, such a comparison can be performed remotely, e.g., by remote computing system 136.

As described above, steps 210 through 250 may be generally used for querying or reading a component for identification data and authenticating that identification data against previously obtained data associated with the component. More specifically, a component is validated if it contains a component identifier that matches a reference identifier in the database. As used herein, the component identifier "matches" the reference identifier if a positive identification or verification may be made between the two parts. In this regard, a 100% identical match is not required, as the localized density variations changed during the life of the component, there may be variations in scanner accuracy or calibration, etc. However, there should still be a sufficient resemblance between the component identifier and the reference identifier that a party may, with a reasonable degree of accuracy, determine that the component bearing the component identifier is indeed the same component from which the reference identifier was obtained and catalogued in the database.

As discussed herein, one or more portion(s) of method 200 can be implemented by controller 134, by remote computing system 136, or both. Thus, for example, it should be appreciated that according to certain embodiments, the component authentication may be performed by a party other than the end user, e.g., the manufacturer. In such an embodiment, the end user may transmit the component identifier as measured from the component to the manufacturer. The manufacturer may then perform steps 230 through 250—i.e., obtain the reference identifier, compare the reference identifier and the component identifier, and make a determination regarding authenticity. If the component is determined to be authentic, the manufacturer may then transmit a signal to the end user indicating that the component is authentic. By contrast, if the component identifier does not match a reference identifier from the database, the manufacturer may provide an indication to the end user that the component might be a counterfeit.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using component 100 as an example, it should be appreciated that these methods may be applied to authenticate any suitable component.

An additively manufactured component and a method for manufacturing and authenticating that component are described above. Using the additive manufacturing methods described herein, the component may include identifying features that are smaller, more complex, and more intricate than possible using prior manufacturing methods. In addition, these features may be difficult or impossible to detect, very difficult to reverse engineer, and nearly impossible reproduce, e.g., for the purpose of producing counterfeit products. For example, the localized density variations may be designed to appear random and non-obvious. These features may further be formed such that they are not visible to the human eye and may be read using x-ray CT interrogation methods directed to a specific identifying region of the component that is unknown to third parties. These features may be introduced during the design of the component, such that they may be easily integrated into components during the build process at little or no additional cost. The features may also serve as a robust identifier capable of withstanding high temperatures without degradation throughout the life of the component, with little or no impact on the quality of the component. Furthermore, these features may be authenticated through comparison with previously catalogued reference identifiers.

Figure 5:
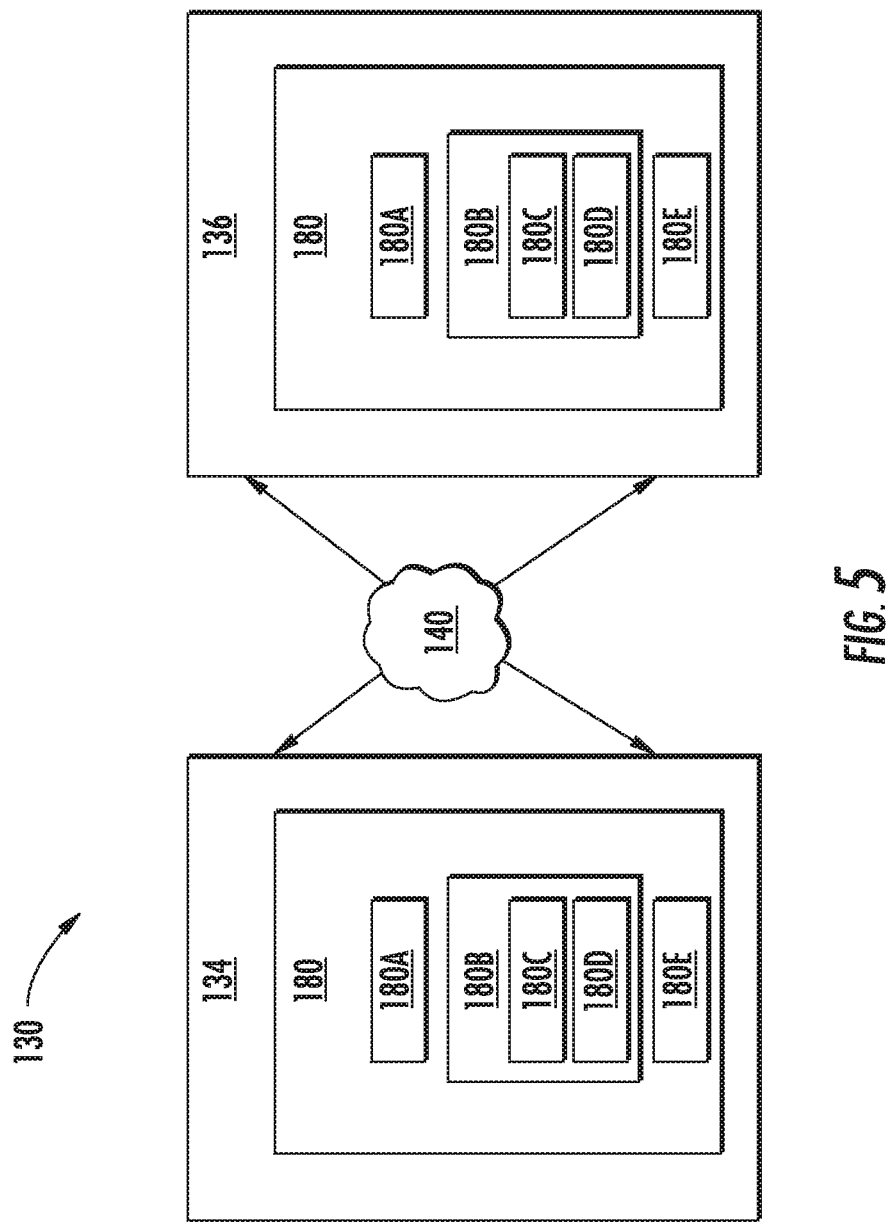
FIG. 5 depicts certain components of an authentication system according to example embodiments of the present subject matter.

FIG. 5 depicts authentication system 130 according to example embodiments of the present disclosure. As described above, authentication system 130 can include one or more controllers 134 and/or remote computing systems 136, which can be configured to communicate via one or more network(s) (e.g., network(s) 140). According to the illustrated embodiment, remote computing system 136 is remote from controller 134. However, it should be appreciated that according to alternative embodiments, remote computing system 136 can be included with or otherwise embodied by controller 134.

Controller 134 and remote computing system 136 can include one or more computing device(s) 180. Although similar reference numerals will be used herein for describing the computing device(s) 180 associated with controller 134 and remote computing system 136, respectively, it should be appreciated that each of controller 134 and remote computing system 136 may have a dedicated computing device 180 not shared with the other. According to still another embodiment, only a single computing device 180 may be used to implement method 200 as described above, and that computing device 180 may be included as part of controller 134 or remote computing system 136.

Computing device(s) 180 can include one or more processor(s) 180A and one or more memory device(s) 180B. The one or more processor(s) 180A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180B can include one or more non-transitory computer-readable storage medium(s), such as RAM, ROM, EEPROM, EPROM, flash memory devices, magnetic disks, etc., and/or combinations thereof.

The memory device(s) 180B can include one or more computer-readable media and can store information accessible by the one or more processor(s) 180A, including instructions 180C that can be executed by the one or more processor(s) 180A. For instance, the memory device(s) 180B can store instructions 180C for running one or more software applications, displaying a user interface, receiving user input, processing user input, etc. In some implementations, the instructions 180C can be executed by the one or more processor(s) 180A to cause the one or more processor(s) 180A to perform operations, as described herein (e.g., one or more portions of method 200). More specifically, for example, the instructions 180C may be executed to perform a comparison between a reference identifier and a component identifier, to perform an authentication analysis, to transmit an indication of authenticity, etc. The instructions 180C can be software written in any suitable programming language or can be implemented in hardware. Additionally, and/or alternatively, the instructions 180C can be executed in logically and/or virtually separate threads on processor(s) 180A.

The one or more memory device(s) 180B can also store data 180D that can be retrieved, manipulated, created, or stored by the one or more processor(s) 180A. The data 180D can include, for instance, data indicative of reference identifiers associated with authentic additively manufactured components. The data 180D can be stored in one or more database(s). The one or more database(s) can be connected to controller 134 and/or remote computing system 136 by a high bandwidth LAN or WAN, or can also be connected to controller through network(s) 140. The one or more database (s) can be split up so that they are located in multiple locales. In some implementations, the data 180D can be received from another device.

The computing device(s) 180 can also include a communication interface 180E used to communicate with one or more other component(s) of authentication system 130 (e.g., controller 134 or remote computing system 136) over the network(s) 140. The communication interface 180E can include any suitable components for interfacing with one or more network(s), including for example, transmitters, receivers, ports, controllers, antennas, or other suitable components.

The network(s) 140 can be any type of communications network, such as a local area network (e.g. intranet), wide area network (e.g. Internet), cellular network, or some combination thereof and can include any number of wired and/or wireless links. The network(s) 140 can also include a direct connection between one or more component(s) of authentication system 130. In general, communication over the network(s) 140 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. It should be appreciated that the inherent flexibility of computer-based systems allows for a great variety of possible configurations, combinations, and divisions of tasks and functionality between and among components. For instance, computer processes discussed herein can be implemented using a single computing device or multiple computing devices (e.g., servers) working in combination. Databases and applications can be implemented on a single system or distributed across multiple systems. Distributed components can operate sequentially or in parallel. Furthermore, computing tasks discussed herein as being performed at the computing system (e.g., a server system) can instead be performed at a user computing device. Likewise, computing tasks discussed herein as being performed at the user computing device can instead be performed at the computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of authenticating an additively manufactured component, the method comprising:
    locating an identifying region of the component, the identifying region comprising localized density variations that define a component identifier of the component, wherein locating the identifying region of the component comprises locating a datum feature on the component, the datum feature being positioned at a predetermined location relative to the identifying region, and determining the location of the identifying region based on the location of the datum feature;
    obtaining data indicative of the component identifier of the component by interrogating the identifying region of the component using a scanning device; and
    determining that the component is authentic based on the data acquired by the scanning device.

2. The method of claim 1, wherein the datum feature is a localized density variation located outside of the identifying region.

3. The method of claim 1, wherein determining that the component is authentic comprises:
    obtaining a reference identifier from a database;
    comparing the component identifier to the reference identifier; and determining that the component is authentic if the component identifier substantially matches the reference identifier.

4. The method of claim 1, wherein the scanning device obtains the component identifier by interrogating the identifying region using x-ray computed tomography.

5. The method of claim 1, wherein the identifying region comprises a first material having a first density and a second material having a second density, the second material being selectively positioned within the first material to define the localized density variations.

6. The method of claim 5, wherein the first material and the second material are additively manufactured into the component.

7. The method of claim 1, wherein the localized density variations are inherent in the manufactured component.

8. A system for authenticating an additively manufactured component, the system comprising:
one or more processors; and
one or more memory devices, the one or more memory devices storing computer-readable instructions that when executed by the one or more processors cause the one or more processors to perform operations, the operations comprising:
obtaining data indicative of an identifying region of the component, the identifying region containing one or more localized density variations that define a component identifier, wherein obtaining data indicative of the identifying region of the component comprises locating one or more datum features on the component, the one or more datum features being positioned at a predetermined location relative to the identifying region, and determining the location of the identifying region based on the location of the one or more datum features;
determining the component identifier by interrogating the identifying region of the component using a scanning device;
obtaining a reference identifier from a database; and
determining that the component is authentic if the component identifier matches the reference identifier.

9. The system of claim 8, wherein the one or more datum features is a localized density variation located outside of the identifying region.

10. The system of claim 8, wherein the scanning device obtains the component identifier by interrogating the identifying region using x-ray computed tomography.

11. The system of claim 8, wherein the identifying region comprises a first material having a first density and a second material having a second density, the second material being selectively positioned within the first material to define the localized density variations.

12. The method of claim 11, wherein the first material and the second material are additively manufactured into the component.

13. The method of claim 8, wherein the localized density variations are inherent in the manufactured component.

14. A method of authenticating a component, the method comprising:
locating one or more datum features on the component, the one or more datum features being positioned at a predetermined location relative to an identifying region;
determining the location of the identifying region based on the location of the one or more datum features;
interrogating the identifying region of the component using x-ray computed tomography to generate a map of localized density variations that are located within the identifying region, the map of localized density variations defining a component identifier;
obtaining a reference identifier from a database; and
determining that the component is authentic if the component identifier matches the reference identifier.

15. The method of claim 14, wherein the identifying region comprises a first material having a first density and a second material having a second density, the second material being selectively positioned within the first material to define the localized density variations.

16. The method of claim 14, the localized density variations are formed by decreasing an energy level of an energy source to selectively underexpose a powder material to generate voids within the identifying region.

17. The method of claim 14, wherein the localized density variations are formed by increasing an energy level of an energy source to selectively overexpose a powder material to generate boiling porosity within the identifying region.

18. The method of claim 14, wherein the localized density variations are inherent in the manufactured component.

* * * * *